(12) United States Patent
Hu et al.

(10) Patent No.: US 8,393,138 B2
(45) Date of Patent: Mar. 12, 2013

(54) OXYGEN-ENRICHED AIR ASSISTING SYSTEM FOR IMPROVING THE EFFICIENCY OF COGENERATION SYSTEM

(75) Inventors: Tailai Hu, Greenville, SC (US); Pavol Pranda, Hockessin, DE (US)

(73) Assignee: American Air Liquide, Inc., Fremont, CA (US)

( * ) Notice: Subject to any disclaimer, the term of this patent is extended or adjusted under 35 U.S.C. 154(b) by 111 days.

(21) Appl. No.: 13/112,299

(22) Filed: May 20, 2011

(65) Prior Publication Data

US 2011/0220037 A1  Sep. 15, 2011

Related U.S. Application Data

(62) Division of application No. 11/423,132, filed on Jun. 8, 2006, now Pat. No. 7,950,217.

(60) Provisional application No. 60/707,930, filed on Aug. 12, 2005.

(51) Int. Cl.
   *F02C 7/08* (2006.01)
(52) U.S. Cl. .................... 60/39.52; 60/39.182
(58) Field of Classification Search ............... 60/39.182, 60/783, 784, 772, 39.52; 237/12.1; 122/7 B
   See application file for complete search history.

(56) References Cited

U.S. PATENT DOCUMENTS

| | | | |
|---|---|---|---|
| 4,767,319 A | 8/1988 | Vosper | |
| 5,762,008 A | 6/1998 | Martin et al. | |
| 6,726,875 B2 * | 4/2004 | Avart et al. | 266/160 |
| 6,745,573 B2 | 6/2004 | Marin et al. | |
| 6,955,051 B2 | 10/2005 | Marin et al. | |
| 7,014,458 B2 | 3/2006 | Marin et al. | |
| 2003/0097840 A1 | 5/2003 | Hsu | |
| 2003/0172656 A1 | 9/2003 | Labasque et al. | |
| 2004/0231332 A1 | 11/2004 | Saucedo et al. | |

FOREIGN PATENT DOCUMENTS

| | | |
|---|---|---|
| EP | 0884468 | 12/1998 |
| EP | 1698827 | 9/2006 |
| GB | 2365492 | 2/2002 |

OTHER PUBLICATIONS

PCT/IB2006/002026, International Search Report and Written Opinion, mailed Nov. 26, 2007.
Avallone, et al., "Marks' Standard Handbook for Mechanical Engineers," Tenth Edition, McGraw-Hill, 1006, pp. 9-124 to 9-132, 1996.

\* cited by examiner

*Primary Examiner* — Phutthiwat Wongwian
(74) *Attorney, Agent, or Firm* — Christopher J. Cronin

(57) ABSTRACT

Systems and methods for exhaust gas recirculation in which at least a desired effective oxygen concentration is maintained for stable combustion at increased recirculation rates. Oxygen-enriched gas is injected into the recirculated exhaust gas to achieve the desired effective oxygen concentration.

8 Claims, 4 Drawing Sheets

OXYGEN-ENRICHED AIR ASSISTING SYSTEM FOR IMPROVING THE EFFICIENCY OF COGENERATION SYSTEM

CROSS-REFERENCE TO RELATED APPLICATIONS

The present application is a divisional of U.S. patent application Ser. No. 11/423,132, filed Jun. 8, 2006, which claims priority to U.S. provisional application 60/707,930, filed Aug. 12, 2005, titled "Oxygen-Enriched Air Assisting System for Improving the Efficiency of Cogeneration System", the entire contents of each of which are incorporated herein by reference.

BACKGROUND

The power generation research and development community faces an important challenge in the years to come: to produce increased amounts of energy under the more and more stringent constraints of increased efficiency and reduced pollution. The increasing costs associated with fuel in recent years further emphasize this mandate.

Gas turbines offer significant advantages for power generation because they are compact, lightweight, reliable, and efficient. They are capable of rapid startup, follow transient loading well, and can be operated remotely or left unattended. Gas turbines have a long service life, long service intervals, and low maintenance costs. Cooling fluids are not usually required. These advantages result in the widespread selection of gas turbine engines for power generation. A basic gas turbine assembly includes a compressor to draw in and compress a working gas (usually air), a combustor where a fuel (i.e., methane, propane, or natural gas) is mixed with the compressed air and then the mixture is combusted to add energy thereto, and a turbine to extract mechanical power from the combustion products. The turbine is coupled to a generator for converting the mechanical power generated by the turbine to electricity.

A characteristic of gas-turbine engines is the incentive to operate at as high a turbine inlet temperature as prevailing technology will allow. This incentive comes from the direct benefit to both specific output power and cycle efficiency. Associated with the high inlet temperature is a high exhaust temperature which, if not utilized, represents waste heat dissipated to the atmosphere. Systems to capture this high-temperature waste heat are prevalent in industrial applications of the gas turbine.

Examples of such systems are cogeneration systems and combined cycle systems. In both systems, one or more heat exchangers are placed in the exhaust duct of the turbine to transfer heat to feed-water circulating through the exchangers to transform the feed-water into steam. In the combined cycle system, the steam is used to produce additional power using a steam turbine. In the cogeneration system, the steam is transported and used as a source of energy for other applications (usually referred to as process steam).

A prior art cogeneration system typically includes a gas turbine engine, a generator, and a heat recovery steam generator. As discussed earlier, the gas turbine engine includes a compressor, a combustor (with a fuel supply), and a turbine. A compressor operates by transferring momentum to air via a high speed rotor. The pressure of the air is increased by the change in magnitude and radius of the velocity components of the air as it passes through the rotor. Thermodynamically speaking, the compressor transfers mechanical power supplied by rotating a shaft coupled to the rotor to the air by increasing the pressure and temperature of the air. A combustor operates by mixing fuel with the compressed air, igniting the fuel/air mixture to add primarily heat energy thereto. A turbine operates in an essentially opposite manner relative to the compressor. The turbine expands the hot and pressurized combustion products through a bladed rotor coupled to a shaft, thereby extracting mechanical energy from the combustion products. The combusted products are exhausted into a duct. Feed-water is pumped through the steam generator located in the duct where it is evaporated into steam. It is through this process that useful energy is harvested from the turbine exhaust gas. The turbine exhaust gas is expelled into the atmosphere at a stack.

Due to deregulation of the energy market and volatility in energy prices, many cogeneration operators prefer to have the option of shutting down the turbine assembly while retaining the steam generation capability of the cogeneration system (known as fresh air mode operation). To enable operation of this fresh air mode, a furnace is disposed in the exhaust duct. The furnace provides an alternate source of hot gas for steam generation. To increase the efficiency of the fresh air mode, a portion of the exhaust gas may be recirculated back to the furnace. Generally, the efficiency of the fresh air mode increases with an increase in recirculation rate of the exhaust gas. Heat energy lost through the stack also decreases with an increase in recirculation rate of the exhaust gas. However, with the increase of the recirculation rate of exhaust gas, the oxygen concentration at the inlet of the furnace decreases, which, eventually adversely affects combustion stability (of the mixture in the furnace) and generates pollutants. Thus, maintaining stable combustion at the high recirculation rates of exhaust gas is problematic.

SUMMARY

Embodiments of the present invention generally relate to an exhaust gas recirculation system which maintains a desired oxygen concentration for stable combustion at increased recirculation rates. In one embodiment, a method for generating heat energy is provided. The method includes the acts of mixing a first stream of exhaust gas with a stream of fresh air, thereby forming a mixture; injecting the mixture, a stream of fuel, and a stream of oxygen-enriched gas into a burner; combusting and mixing the mixture with the stream of fuel and the stream of oxygen-enriched gas, thereby forming a second stream of the exhaust gas; and dividing the second stream of the exhaust gas into at least the first stream of exhaust gas and a third stream of the exhaust gas.

In another embodiment, a steam generator is provided. The steam generator includes a main duct; a furnace in fluid communication with the main duct. The furnace includes a combustion chamber having a first axial end and a second axial end; and a burner located proximate to the first axial end. The steam generator further includes a heat exchanger having a first chamber physically separate from and in thermal communication with a second chamber, the first chamber either in fluid communication with the main duct or being part of the main duct, the first chamber in fluid communication with the second axial end of the combustion chamber. The steam generator further includes a recirculation system. The recirculation system includes a first diverter damper in fluid communication with the first chamber of the heat exchanger and a recycle duct; the recycle duct in fluid communication with the diverter damper and a mixing damper; and the mixing damper in fluid communication with the main duct and fresh air. The steam generator further includes an oxygen-enrichment system. The oxygen-enrichment system includes a source of oxygen-enriched gas in fluid communication with the burner via an oxygen line.

In another embodiment, a control system for use with a cogeneration system is provided. The control system includes a memory unit containing a set of instructions; a control valve configured to meter a flow rate of oxygen-enriched gas; an oxygen sensor configured to measure an oxygen concentration of a mixture of exhaust gas and fresh air, the oxygen sensor in electrical communication with a processor; and a processor configured to control operation of the control valve and perform an operation, when executing the set of instructions. The operation includes acts of comparing the measured oxygen concentration of the mixture with a predetermined oxygen concentration; and if the measured oxygen concentration is not substantially equal to the predetermined oxygen concentration, then calculating a flow rate of oxygen-enriched gas in order to maintain a predetermined oxygen concentration only in a volume proximate to an ignited flame of the fuel; and adjusting the control valve to provide a flow rate substantially equal to the calculated flow rate.

In another embodiment, a method for generating heat energy using a cogeneration system including a gas turbine engine and a steam generation system, where the method includes acts of operating the cogeneration system in a first mode in which the gas turbine engine is operated to produce energy; and operating the cogeneration system in a second mode in which the gas turbine engine is disabled and the steam generation system operates to generate energy, The operation in the second mode includes acts of flowing a combustible mixture into an ignition unit in order to combust the combustible mixture and produce exhaust gas; introducing a recirculated portion of the exhaust gas at a location of the steam generation system upstream of the ignition unit; and introducing an oxygen-enriched gas at a location of the steam generation system proximate to the ignition unit.

In another embodiment, a method for generating heat energy is provided. The method includes the acts of mixing a first stream of exhaust gas with a stream of fresh air, thereby forming a mixture; injecting the mixture, a stream of fuel, and a stream of oxygen-enriched gas into a burner of a cogeneration system comprising a gas turbine engine and a steam generation system; combusting and mixing the mixture with the stream of fuel and the stream of oxygen-enriched gas, thereby forming a second stream of the exhaust gas; controlling a flow rate of the stream of oxygen-enriched gas being injected into the burner; dividing the second stream of the exhaust gas into at least a third stream of exhaust gas and a fourth stream of the exhaust gas; and recirculating the third stream of exhaust gas to form the first stream of exhaust gas.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
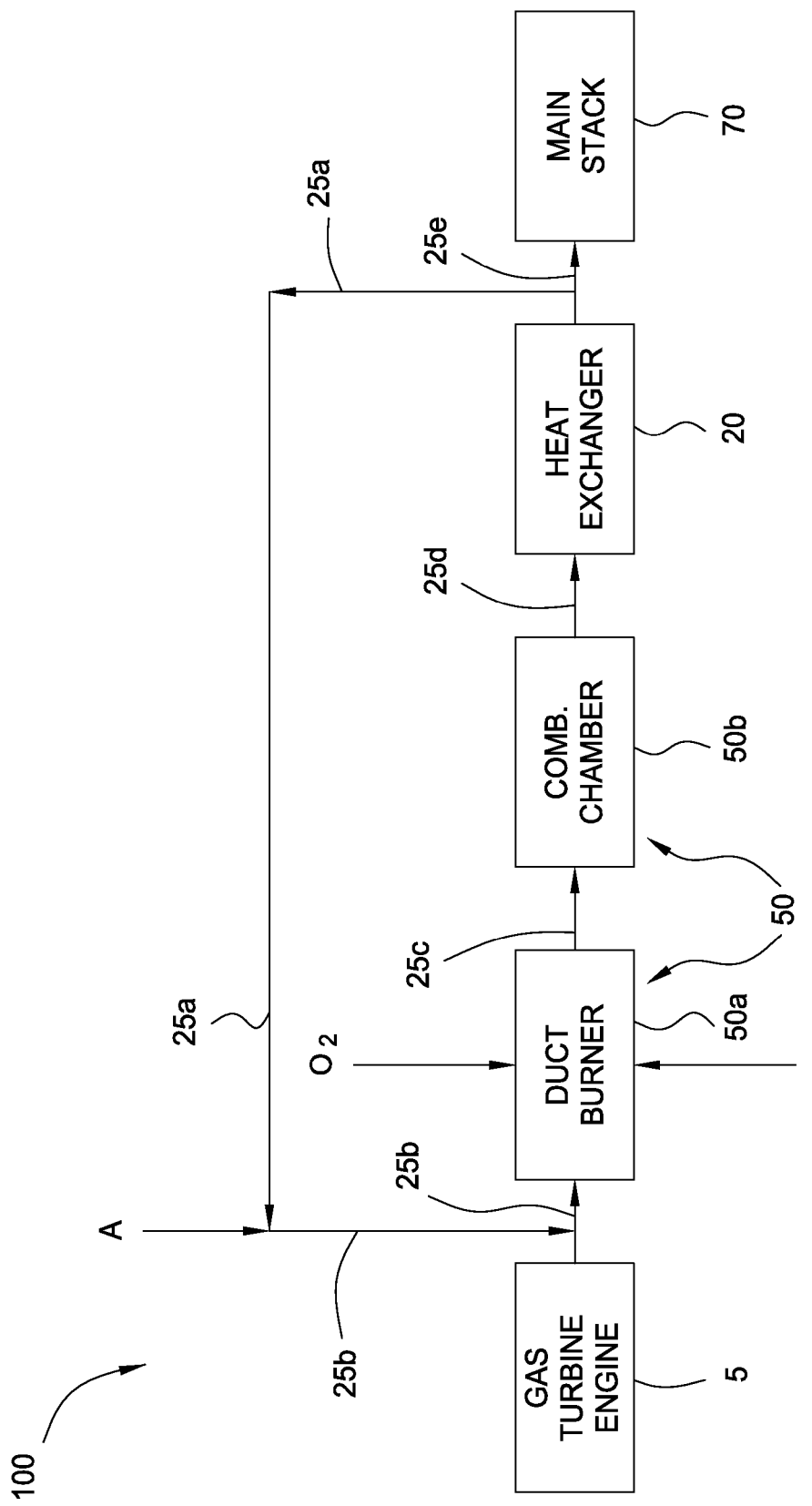
FIG. 1 is a process flow diagram of a cogeneration system, according to one embodiment of the present invention.

FIG. 1 is a process flow diagram of a cogeneration system 100, according to one embodiment of the present invention. The cogeneration system 100 includes a gas turbine engine 5, a furnace 50, at least one heat exchanger 20, and a main stack 70. The furnace 50 and the heat exchanger 20 are typically referred to as a heat recovery steam generator. The cogeneration system 100 is operable in either cogeneration mode or fresh air mode. In cogeneration mode, the gas turbine engine 5 is operating, whereas, in fresh air mode, the gas turbine engine 5 is shut-down and the heat recovery steam generator is operated using an alternative fuel source. The furnace 50 includes a combustion chamber 50b and a duct burner 50a connected to a fuel supply F. The furnace 50 provides an alternate source of hot gas for steam generation in fresh air mode.

In one embodiment of operation, a first stream 25a of exhaust gas is mixed with a stream of fresh air A, thereby forming a mixture 25b. The first mixture 25b is injected, along with a stream of fuel F and a stream of oxygen-enriched gas O2, into the duct burner 50a. Combustion and mixing of the first mixture with the fuel stream F and the oxygen-enriched stream of gas O2 substantially occur in the combustion chamber 50b (some mixing and/or combustion may occur in the duct burner 50a). A second stream 25d of the exhaust gas results from the mixture and combustion of the composite stream 25c. Heat energy is extracted from the second stream 25d of the exhaust gas in the heat exchanger 20 to produce steam. The second stream 25d of the exhaust gas is divided into at least the first stream 25a of the exhaust gas and a third stream 25e of the exhaust gas. The third stream 25e of the exhaust gas may be released into the atmosphere at the main stack 70.

Figure 2:
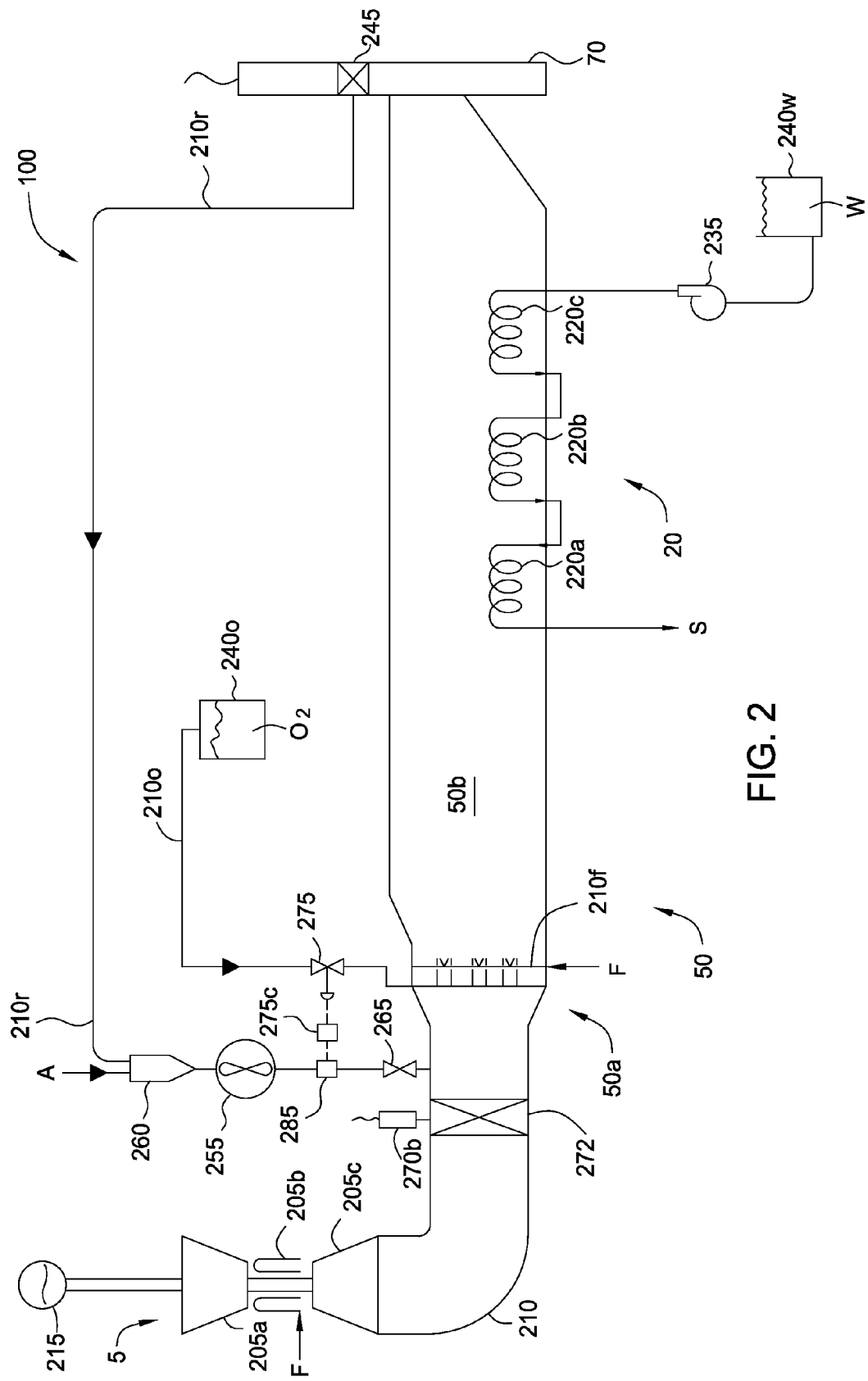
FIG. 2 is a schematic diagram of a cogeneration system, according to one embodiment of the present invention.

FIG. 2 is a schematic diagram of the cogeneration system 100, according to one embodiment of the present invention. The gas turbine engine 5 includes a compressor 205a, a combustor 205b (with a fuel supply F), and a turbine 205c. The gas turbine engine 5 is coupled to a generator 215. The combusted products from the gas turbine engine 5 are exhausted into a main exhaust duct 210. Disposed in the exhaust duct 210 are one or more heat exchangers 20. In the illustrative embodiment, the one or more heat exchangers 20 include a super-heater 220a, an evaporator 220b, and an economizer 220c. Since the super-heater 220a is disposed closest to the turbine 205c, it is exposed to the highest temperature combustion products, followed by the evaporator 220b and the economizer 220c.

Feed-water W is pumped through these exchangers 220a,b,c from feed-water tank 240w by feed-water circulation pump 235. The feed-water W first passes through the economizer 220c. At this point, the exhaust gas is usually below the saturation temperature of the feed-water W. The term saturation temperature designates the temperature at which a phase change occurs at a given pressure. The exhaust gas is cooled by the economizer 220c to lower temperature levels for greater heat recovery and thus efficiency. The heated feed-water W then passes through the evaporator 220b where it achieves saturation temperature and is at least substantially transformed into steam S. The steam S then proceeds through the super-heater 220a where further heat energy is acquired by the steam to raise its temperature above saturation, thereby increasing the availability of useful energy therein. The superheated steam S is then transported for utilization in other processes, for example, refining crude oil, manufacturing chemicals, or generating electricity using a steam turbine. It is through this process that useful energy is harvested from the turbine exhaust gas. The turbine exhaust gas is expelled into the atmosphere at the main stack 70.

To enable operation of the fresh air mode, the furnace 50 is disposed in the exhaust duct 210. A by-pass stack 270b and by-pass damper 272 are used for transition between cogeneration mode and fresh air mode. The by-pass damper 272 also prevents air leakage into the gas turbine engine 5 during fresh air mode. To increase the efficiency of the fresh air mode, a diverter damper 245 is disposed in the main stack 70 so that a stream 25a of the exhaust gas may be recirculated back to the furnace 50. Alternatively, the diverter damper 245 could be located in the exhaust duct 210 at a location downstream of the economizer 220c. The recycled exhaust gas 25a stream is transported from the diverter damper 245 by a recirculation duct 210r. The recirculation duct 210r carries the stream 25a of exhaust gas to a mixing duct 260 where the stream 25a of exhaust gas is mixed with a stream A of fresh air. A damper 265 is provided to shut in the recirculation duct 210r during cogeneration mode.

A fan 255 provides the necessary power for recirculation of the stream exhaust gas and mixing thereof with the fresh air A. The fresh air/exhaust gas mixture 25b is usually injected into the exhaust duct 210 at a distance upstream of the furnace 250 to allow complete mixing of the exhaust gas with the fresh air. The mixture 25b then travels through the exhaust duct 210 to the duct burner 50a where the fuel stream F and the oxygen-enriched gas stream $O_2$ are injected and the fuel stream F is ignited into a fuel flame 410f (see FIG. 4). Combustion and mixing of the fresh air/exhaust gas mixture 25b with the fuel stream F and the oxygen-enriched stream of gas $O_2$ substantially occur in the combustion chamber 50b (some mixing and/or combustion may occur in the duct burner 50a).

The oxygen-enriched gas may be stored in liquid form in a tank 240o. Alternatively, an oxygen generator (not shown) may be located on-site. In one embodiment, the oxygen-enriched gas $O_2$ may be any gas having an oxygen concentration greater than about 21%. In particular embodiments, the oxygen-enriched gas $O_2$ may be any gas having an oxygen concentration greater than about 25%, or greater than about 50%, or greater than about 90%. It is also contemplated that the oxygen-enriched gas $O_2$ is commercially-pure oxygen. The oxygen-enriched gas $O_2$ is carried from the oxygen tank 240o, via pipe or tubing 210o, through a control valve 275 to a header pipe 210o disposed in the duct burner 50a. The oxygen-enriched gas $O_2$ is injected into the duct burner 50a through nozzles 310o (see FIG. 3). An oxygen sensor 285 is disposed in the recirculation duct 210r and is in electrical communication with a controller 275c in the control valve 275. The controller 275c may also be in electrical communication with other sensors, for example, a carbon monoxide sensor (not shown) and/or a second oxygen sensor (not shown) disposed in the combustion chamber 50b. Alternatively, the oxygen sensor 285 may be located in the combustion chamber 50b. Alternatively, the oxygen-enriched gas $O_2$ may be mixed with fresh air prior to injection in the duct burner 50a. In this scenario, the controller may also control a control valve to meter a ratio of the oxygen-enriched gas to the fresh air. Alternatively, a fan may be disposed in the oxygen pipe 210o. The controller 275c is a device configured by use of a keypad or wireless interface with machine executable instructions to execute desired functions. The controller 275c includes a microprocessor for executing instructions stored in a memory unit.

Preferably, the controller 275c adjusts a flow rate of the oxygen-enriched gas $O_2$ so that a predetermined oxygen concentration (POC) is maintained only in a volume 410o (see FIG. 4) proximate to the ignited flame 410f of fuel F. Maintaining the POC only in a localized blanket 410o surrounding the flame 410f minimizes the amount of precious oxygen used. Preferably, the POC for stable combustion is between about 18% and about 18.5%, less preferably, about 17.5% and, least preferably, at about 17%, according to one embodiment of the present invention (depending on specific burner and combustion chamber configuration). Alternatively, the controller 275c may adjust the flow rate so that the POC for the entire stream of the fresh air/exhaust gas mixture 25b is maintained or any portion of the fresh air/exhaust gas mixture 25b.

The fuel F may be stored in a fuel tank (not shown) and carried to a header pipe 210f in the duct burner 50a by a fuel pipe (not shown). The fuel F is injected into the duct burner through nozzles 310f (see FIG. 3). The fuel may be delivered to the fuel nozzles 310f by a fuel pump (not shown) disposed along and in fluid communication with the fuel pipe.

Figure 3:
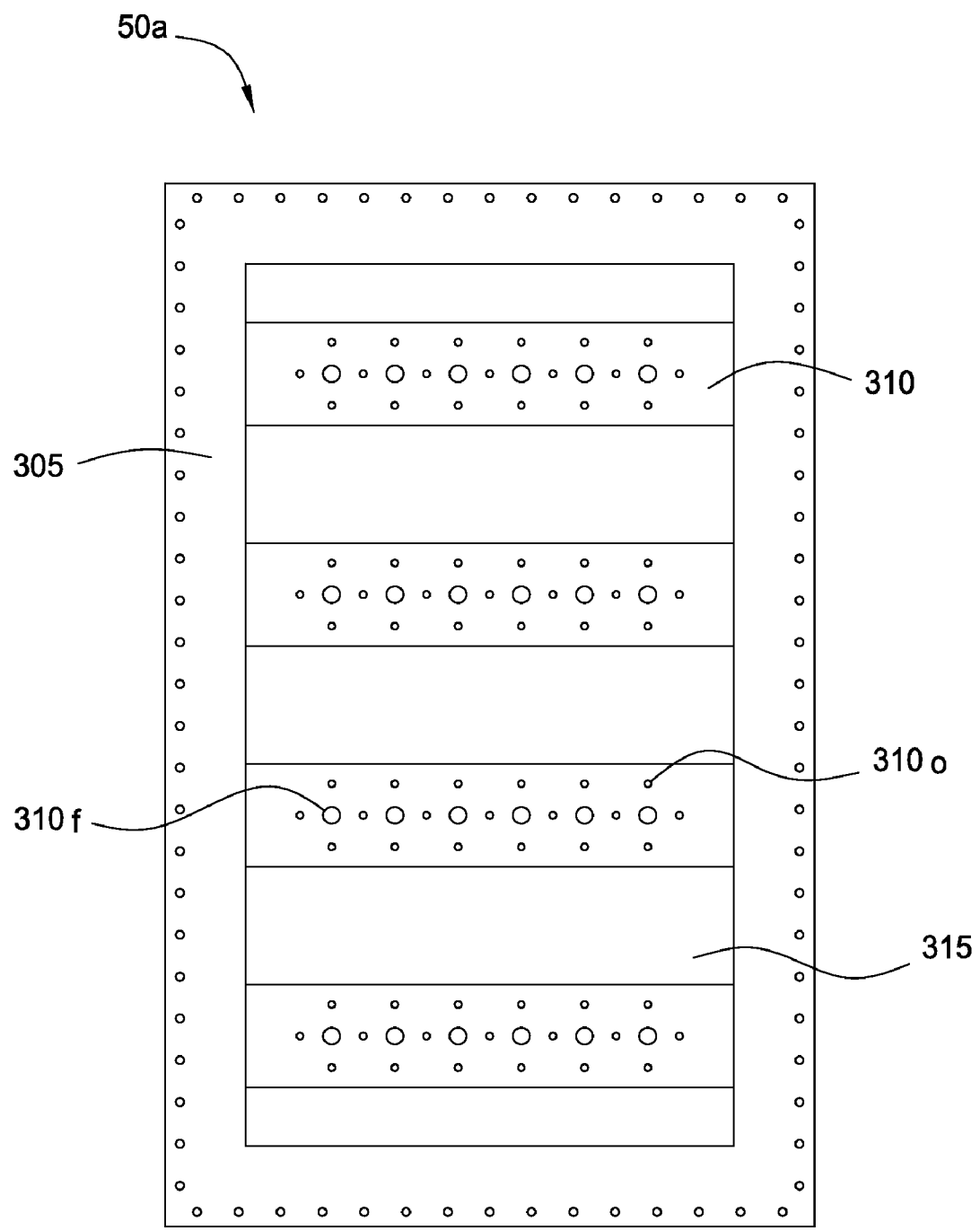
FIG. 3 is a simplified end view of a duct burner, according to one embodiment of the present invention.

FIG. 3 is a simplified end view of the duct burner 50a, according to one embodiment of the present invention. The end of the duct burner 50a shown is the end that faces the combustion chamber 50b. The duct burner 50a includes a flange 305 having holes for receiving fasteners to couple the end to the combustion chamber 50b. One or more sub-ducts 315 are formed in the duct burner 50a. The sub-ducts 315 are in fluid communication with the exhaust duct 210. The duct burner also includes one or more burners 310. Each burner 310 includes the fuel nozzles 310f in fluid communication with the header pipe 210f and the oxygen nozzles 310o in fluid communication with the header pipe 210o. As shown, an oxygen nozzle 310o is disposed proximately above and below each fuel nozzle 310f and, optionally, between each fuel nozzle 310f. An oxygen nozzle 310o is also optionally disposed at each horizontal end of the fuel nozzles 310f. Alternatively, an oxygen nozzle may be disposed concentrically around each fuel nozzle 310f.

Figure 4:
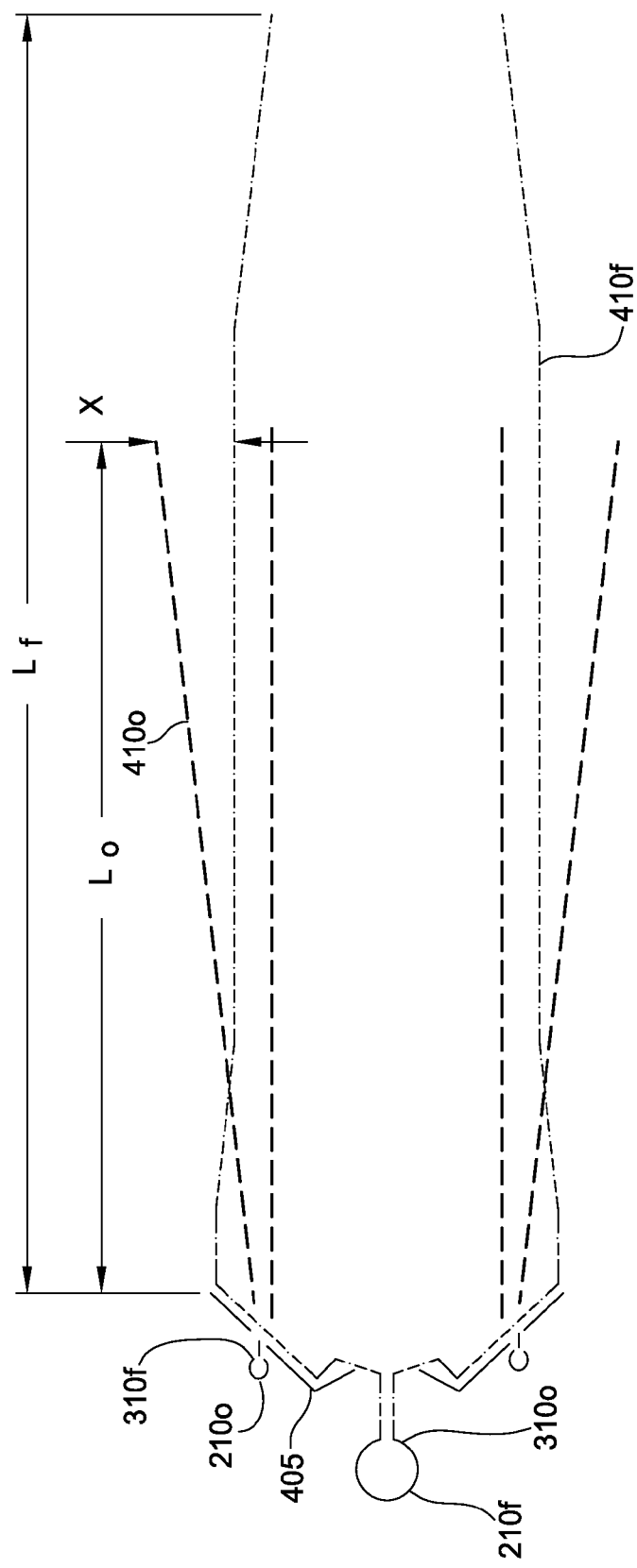
FIG. 4 is a schematic of a duct burner nozzle in operation being blanketed by oxygen-enriched gas, according to one embodiment of the present invention.

FIG. 4 is a schematic of a duct burner nozzle in operation being blanketed by oxygen-enriched gas $O_2$, according to one embodiment of the present invention. The ignited stream of fuel F forms a flame 410f through an opening in a flame shield 405. Streams of oxygen-enriched gas $O_2$ are injected at other openings in the flame shield 405 to form blankets 510 around each of upper and lower portions of the flame 410f. If the optional side nozzles or the alternative concentric nozzle is used, then the blanket(s) will substantially surround a periphery of the flame 410f. As shown, the blankets 410o each longitudinally extend along a periphery of the flame 410f a distance $L_o$ which is a substantial portion of the flame length $L_f$. Past $L_o$, the blanket may dissipate so that the POC is no longer maintained. The ratio $L_o/L_f$ of the blanket length $L_o$ to the flame length $L_f$ may range from three-tenths to one, depending on the specific duct burner 50a configuration and cogeneration system 100. In one embodiment, the ratio $L_o/L_f$ is ranges from five-tenths to one. Alternatively, the ratio $L_o/L_f$ may be greater than one. As shown, each blanket also has a maximum thickness X measured from the periphery of the flame 410f radially outward to the periphery of a respective blanket 410o. The maximum thickness X may range from five to twenty centimeters, depending on the duct burner 50a configuration and cogeneration system 100. Alternatively, the maximum thickness X may be less than or equal to ten centimeters. Some variables that may effect these ranges are the orientation of the oxygen nozzles 310o, the velocity of the oxygen-enriched gas $O_2$ exiting the oxygen nozzles 310o, the size of the nozzles 310o, the shape of the nozzles 310o, and the configuration of the nozzles 310o.

EXAMPLES

Table 1 exhibits effects of varying recirculation rates on combustion and efficiency of a conventional cogeneration system operating in free air mode. The entries marked by an "X" indicate cases where the oxygen concentration in a fresh air/exhaust gas mixture injected into the duct burner are insufficient for stable combustion. This oxygen-deficient condition results for increased rates (greater than or equal to about 30%) of recycled exhaust gas.

TABLE 1

Effect of Various Recirculation Rates on Combustion and Efficiency of a Cogeneration System Operating in Free Air Mode

| Unstable Comb. | Recirculation Rate | Global Efficiency | $O_2$ To Burner | $O_2$ In Exhaust Gas |
|---|---|---|---|---|
|   | 0%  | 83%   | 20.7%  | 13.5% |
|   | 20% | 85.8% | 18.9%  | 11.9% |
|   | 30% | 87.2% | 17.45% | 10.6% |
| X | 35% | 88.0% | 16.73% | 9.95% |
| X | 40% | 88.8% | 16%    | 9.3%  |
| X | 45% | 89.6% | 14.6%  | 7.98% |

In operation, especially during increased recirculation rates, the fresh air and recycled gas mixture 25b flows through the sub-ducts 315 and begins combustion when it reaches the burners 310. If the oxygen sensor 285 detects an oxygen deficient condition, the controller 275c opens the control valve 275 to compensate the oxygen deficient mixture 25b by injecting the oxygen-enriched gas $O_2$ through the oxygen nozzles 310o in the duct burner 50a. The oxygen-enriched gas $O_2$ increases the oxygen-concentration of the mixture 25b in the localized volume 410o surrounding the ignited flame 410f, thereby allowing stable ignition of the fuel F. The stable ignition of the flame 410f provided by the blanket 410o of oxygen-enriched gas $O_2$ facilitates stable combustion of the oxygen-deficient mixture 25b with the fuel F in the combustion chamber 50b. Stable combustion allows for realization of higher global efficiencies (see Table 1) associated with increased recirculation rates without the unwanted side effects, i.e. increased pollution, that would otherwise accompany unstable combustion at the increased recirculation rates. In one embodiment, the oxygen-enriched cogeneration system 100 may maintain an effective oxygen concentration in the burner 50a at a level that is acceptable for stable combustion up to about a 45% recirculation rate. In another embodiment, the oxygen-enriched cogeneration system 100 may maintain an effective oxygen concentration in the burner 50a at a level that is acceptable for stable combustion up to about a 60% recirculation rate.

Thus, in one embodiment, oxygen-enriched cogeneration system 100 operates to vary the oxygen concentration in a fresh air/exhaust gas mixture injected into the duct burner 50a according to different recirculation rates. In this way, the oxygen-enriched cogeneration system 100 is capable of maintaining an effective substantially constant oxygen concentration in the duct burner 50a at different recirculation rates of the exhaust gas. Different recirculation rates give a cogeneration system greater flexibility for design while relatively effective constant oxygen content to the burner 50a facilitates better control of combustion in the system 100.

Alternatively, the oxygen-enrichment may also be used in cogeneration mode and in other steam generation systems, such as combined cycle systems and any system using a heat recovery steam generator or integrated boiler system.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A steam generator, comprising:
   a) a main duct in fluid communication with a gas turbine engine;
   b) a furnace in fluid communication with the main duct, the furnace comprising:
      i) a combustion chamber having a first axial end and a second axial end; and
      ii) a burner located proximate to the first axial end;
   c) a heat exchanger having a first chamber physically separate from and in thermal communication with a second chamber, the first chamber either in fluid communication with the main duct or being part of the main duct, the first chamber in fluid communication with the second axial end of the combustion chamber; and
   d) a recirculation system, comprising:
      i) a first diverter damper in fluid communication with the first chamber of the heat exchanger and a recycle duct;
      ii) the recycle duct in fluid communication with the diverter damper and a mixing damper; and
      iii) the mixing damper in fluid communication with main duct and fresh air;
   e) an oxygen-enrichment system, comprising
      i) a source of oxygen-enriched gas in fluid communication with the burner via an oxygen line.

2. The steam generator of claim 1, wherein the burner is a duct burner having first nozzle in fluid communication with a fuel supply and a second nozzle disposed proximate to the first nozzle, the second nozzle in fluid communication with the oxygen-enriched gas source.

3. The steam generator of claim 2, wherein the recirculation system further comprises an oxygen sensor disposed in the recycle duct, the oxygen-enrichment system further comprises a control valve, having a controller, disposed in the oxygen line, and the oxygen sensor is in electrical communication with the controller.

4. The steam generator of claim 3, wherein the second nozzle and the control valve are operable to maintain a predetermined oxygen concentration only in a volume proximate to an ignited flame of the fuel.

5. The steam generator of claim 4, wherein the predetermined oxygen concentration is between about 17% and about 18.5%.

6. The steam generator of claim 1, wherein the burner is a duct burner having first nozzle in fluid communication with a fuel supply and a second nozzle and a third nozzle disposed proximate to the first nozzle, the second and third nozzles in fluid communication with the oxygen-enriched gas source.

7. The steam generator of claim 1, further comprising a feed-water tank; and a feed-water pump in fluid communication with the second chamber of the heat exchanger and the feed-water tank.

8. The steam generator of claim 1, further comprising second and third heat exchangers, wherein the heat exchanger is located proximate to the second axial end of the combustion chamber, the third heat exchanger is located distal from the second axial end of the combustion chamber, and the second exchanger is located between the other two exchangers.

* * * * *